July 23, 1929. H. W. LINDHOLM 1,721,519
VEHICLE AIR BRAKE
Filed Dec. 15, 1927   2 Sheets-Sheet 2

Inventor
Harry W. Lindholm

By Clarence A. O'Brien
Attorney

Patented July 23, 1929.

1,721,519

UNITED STATES PATENT OFFICE.

HARRY W. LINDHOLM, OF HOLMQUIST, SOUTH DAKOTA.

VEHICLE AIR BRAKE.

Application filed December 15, 1927. Serial No. 240,200.

The present invention relates to an air brake for vehicles adapted particularly for use in connection with motor vehicles and has for an object to provide an air compressor operatively connected with the motor of the vehicle for creating a supply of compressed air and to provide a brake actuating device connected with the compressed air tank and controlled through the brake or clutch pedal of the vehicle, so that when the clutch pedal is applied communication between the brakes and the compressed air tank will at the same time become open in a manner causing the brake to be applied.

A further object of the invention is to provide automatic pressure control means for the air compressing apparatus and arranged to prevent the continuous compressing of the air in the tank after the same has reached a predetermined pressure.

Another object of the invention is to provide an apparatus of this character which may be installed in operative position upon a motor vehicle without necessitating any changes in the construction thereof, the air compressing apparatus being adapted for connection in a convenient manner with the fan belt of the machine or with the timing gear shaft and also to provide an apparatus of this character of simple and practical construction, which is efficient and reliable in performance and otherwise well adapted for the purposes for which the same is intended.

Figure 1:
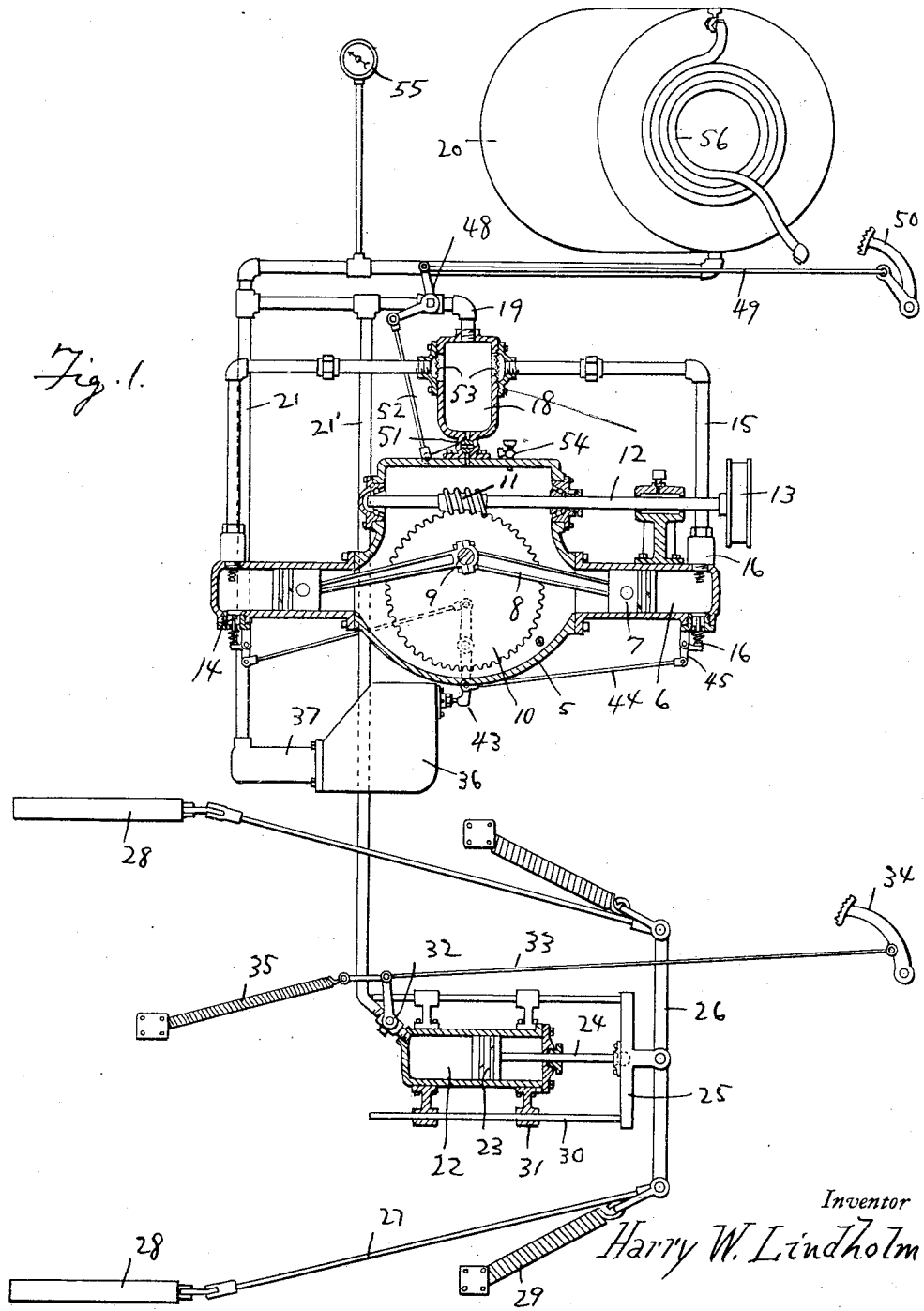
Figure 2:
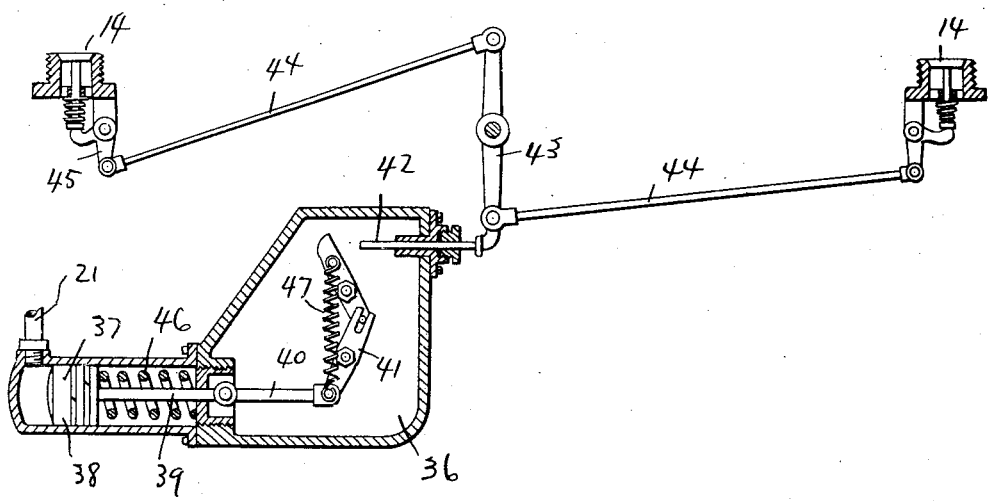
Figure 3:
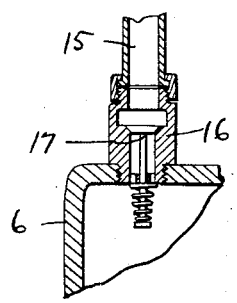

Other objects and advantages reside in the special construction and combination of the various elements comprising the invention, reference being had to the accompanying drawings forming a part hereof, wherein:

Figure 1 is a diagrammatic view illustrating the cooperating position of the various features forming the invention and showing the air compressor pump and brake operating cylinder in section, Figure 2 is a sectional view through the automatic control means for the air compressor and Figure 3 is a fragmentary sectional view through one of the check valves provided for the air compressor and pump cylinder.

Referring now to the drawing in detail, the invention comprises an air compressor including a housing 5 having pump cylinders 6 arranged at opposite sides thereof in which pistons 7 are operatively arranged and connected through connecting rods 8 with an eccentric pin 9 carried on a worm wheel stem rotatably mounted within the housing. The worm wheel is operated through a worm 11 mounted on a shaft 12 extending from the housing and on the outer end of which is arranged a belt pulley wheel 13 which may be operated from the motor of the vehicle in any suitable manner, as for instance by means of the fan belt.

Within the head of each of the cylinders 6 is arranged an air intake valve 14 adapted to be opened by the suction stroke of the piston so as to admit a quantity of air into the cylinder. A compressed air feed pipe 15 is also connected with the head of each cylinder, the coupling 16 forming such connection constituting a valve case for a check valve 17 as is shown in Figure 3 of the drawings arranged to admit air under pressure from the cylinder through the feed pipe 15 during the compression stroke of the piston and adapted to close during the suction stroke thereof. Thus the valves 14 and 17 are mounted for operative opening and closing movement.

Each of the feed pipes 15 extending from the respective cylinders communicate with an air filter 18 and from which extends a feed pipe 19 communicating with a compressed air tank 20.

Auxiliary feed pipes 21 and 21' extend from the pipe 19, the pipe 20 communicating with a brake cylinder 22 having a piston 23 operatively arranged therein, said piston having a piston rod 24 extending therefrom and connected to a cross head 25 with a transversely disposed brake equalizing rod 26 to each end of which brake rods 27 are connected for operative engagement with the brakes of the vehicle indicated at 28.

Coil springs 29 attached to each end of the equalizing rod 26 normally hold the piston 23 inwardly of the cylinder with the brakes 28 in their off position with respect to their respective brake drums. In order to insure the straight longitudinal movement of the cross head 25, guide rods 30 are attached at each end thereof slidably mounted in guides 31 attached at diametrically opposite sides of the cylinder 22.

A two-way valve indicated at 32 is interposed in the feed pipe 20 communicating with the head of the cylinder 22 to which is operatively connected a rod 33 attached to a pedal 34 which may constitute either the brake or clutch pedal of the vehicle. A coil spring 35 is also attached to the valve 32 arranged to normally maintain the same in closed position and operating against the depressing movement of the pedal 34. The valve 32 is arranged to open communication between the pipe 20 and the cylinder 22 upon the depressing of the pedal 34 whereupon it will be apparent that the piston 23 will be forced outwardly, thus causing the brake 28 to be applied.

The other auxiliary pipe 21 extending from the feed pipe 19 communicates with a pressure regulating cut-off mechanism for the air compressor comprising a housing 36 having a cylinder 37 arranged in one end thereof, the pipe 21 communicating with the head of such cylinder. The piston 38 is operatively arranged in the cylinder having a piston rod 39 extending from the cylinder into the housing 36. The outer end of the rod 39 is connected to a link 40 with one end of a pivotally mounted lever 41 formed of a pair of operatively operable sections as illustrated in Figure 2 of the drawing and adapted through the outward movement of the rod 39 to move the free end of the lever 41 into engagement with a push rod 42 slidably mounted in the housing and connected with one end of a lever 43 pivotally mounted on the housing 5 to each end of which is attached one end of a pair of oppositely extending rods 44, with the opposite ends of said rod attached to bell cranks 45 arranged adjacent each of the valves 14 in the respective cylinders of the air compressor. The bell cranks 45 engage the stems of the valve 14 in a manner to cause the opening of the valve upon the operation of the push rods 42 upon the outward movement of the piston 38. A coil spring 46 arranged within the cylinder 37 normally maintains the piston in inward position and a spring 47 attached to the sections of the lever 41 operates to retain the lever out of engagement with the push rod 42 when said piston is disposed inwardly.

The cylinder 37 is in constant communication with the feed pipe 19 of the air compressor, through the auxiliary pipe 21, and the spring 46 is constructed of a suitable tension to offset the movement of the piston 38 at a predetermined air pressure. Should the air in the tank 20 or the feed pipe 19 receive a certain pressure, it will be apparent that the piston 38 will be forced outwardly whereby through its connection with the valve 14 to hold the same in open position, thus prevent a further compression of the air.

A cut-off valve 48 is interposed between pipe 19 and arranged for operation through a rod 49 attached to one of the pedals 50 of the vehicle. A frame valve 51 is also mounted at the lower end of air filter 18 and connected with the valve 48 by a link 52 for simultaneous operation thereof. A section of screening indicated at 53 is arranged at the connection of the air compressor pipe 15 with the filter 18.

A suitable quantity of lubricating oil may be carried within the housing 5 inserted therein through use of the filler plug 54 so as to properly lubricate the piston 7 and other moving parts of the air compressor.

Any oil pumped by the piston through the air compressor pipe 15 upon coming into contact with the screening 53 will be retarded and caused to drip downwardly to the base of the filter where the same will collect and upon the opening of the valve 51 will be permitted to return to the housing 5. It will be noted that the valve 51 is arranged to be opened simultaneously with the valve 48 thereby cutting off communication between the air filter 18 and the tank 20 at the time of the opening of the valve 51 for draining purposes.

An air compressor gauge indicated at 55 is interposed in the feed pipe communicating with the tank 20. An air hose 56 may also be attached to the tank thus enabling the air compressed therein to be utilized for inflating the tires of the vehicle when necessary.

It will be noted from an inspection of Figure 1 of the drawings that the pedals 50 provide means for controlling the communication between the compressor and the tank and brake actuating pistons although communication between the tank and the piston is unaffected thereby. The pedal 34 provides a separate means for controlling communication between the tank and piston. Furthermore neither of the control means affect communication between the tank and the automatic pressure control means for the compressor.

It is obvious that the invention is susceptible of various changes and modification, without departing from the spirit or scope of the invention or sacrificing any of its advantages, and I accordingly claim all such forms of the device to which I am entitled.

Having thus described my invention, what I claim as new is:

1. In combination, an air compressor composed of a plurality of compression cylinders disposed in tandem, pistons operatively arranged in each thereof and connected to a common crank shaft, an air tank connected to the cylinders and having a common air intake and discharge pipe, a brake actuating piston connected for operation with the air intake and discharge pipes of the tank and automatic pressure control means for said air compressor operable for limiting the amount of pressure generated by the pistons of said cylinders.

2. In combination, an air compressor composed of a pair of compression cylinders disposed in tandem, pistons operatively arranged in each thereof and connected to a common crank shaft, an air tank connected to the cylinders and having a common air intake and discharge pipe, a brake actuating piston connected for operation with the air intake and discharge pipe of the tank and manually operable means controlling communication between the compressor and the tank.

3. In combination, an air compressor composed of a pair of compression cylinders disposed in tandem, pistons operatively arranged in each thereof and connected to a common crank shaft, an air tank connected to the cylinders and having a common air intake and discharge pipe, a brake actuating piston connected for operation to the cylinders and having a common air intake and discharge pipe tank, manually operable means controlling communication between the piston and the tank, manually operable means controlling communication between the compressor and the tank and automatic pressure control means for the compressor operable for limiting the amount of compression generated by the pistons of said cylinders.

4. In combination, an air compressor having an air tank connected therewith, a brake actuating piston connected for operation by the air in said tank, and manually operable means controlling communication between the piston and the compressor and between the compressor and the tank.

5. In combination, an air compressor having an air tank connected therewith, a brake actuating piston connected for operation by the air in said tank, manual cut-off means for the compressor controlling communication therewith with both the tank and the piston without effecting communication between the tank and piston, separate manual cut-off means controlling communication between the tank and piston and automatic pressure control means for the compressor.

6. In combination, an air compressor having an air tank connected therewith, operating means for the compressor, means for connection with the drive means of a motor vehicle, an air filter interposed between the compressor and the tank adapted to separate any liquid content from the air, manual control means interposed between the filter and the tank, a plurality of feed pipes communicating with the tank, automatic pressure control cut-off means for the compressor operatively connected with one of said feed pipes, a cylinder connected with another of said feed pipes having a piston operatively arranged therein, vehicle brake operating rods connected for actuation through said piston and manual control means interposed in the feed pipe between the cylinder and the tank.

In testimony whereof I affix my signature.

HARRY W. LINDHOLM.